US008445105B2

(12) United States Patent
Mitani et al.

(10) Patent No.: US 8,445,105 B2
(45) **Date of Patent: *May 21, 2013**

(54) IRON-BASED SOFT MAGNETIC POWDER FOR DUST CORE, METHOD FOR PRODUCTION THEREOF, AND DUST CORE

(75) Inventors: Hiroyuki Mitani, Kobe (JP); Nobuaki Akagi, Takasago (JP); Hirofumi Houjou, Takasago (JP); Chio Ishihara, Matsudo (JP); Makoto Iwakiri, Matsudo (JP); Sohei Yamada, Kosai (JP); Yasukumi Mochimizo, Kosai (JP)

(73) Assignee: Kobe Steel, Ltd., Kobe-shi (JP)

( * ) Notice: Subject to any disclaimer, the term of this patent is extended or adjusted under 35 U.S.C. 154(b) by 107 days.

This patent is subject to a terminal disclaimer.

(21) Appl. No.: 12/439,861

(22) PCT Filed: Aug. 2, 2007

(86) PCT No.: PCT/JP2007/065177

§ 371 (c)(1), (2), (4) Date: Mar. 4, 2009

(87) PCT Pub. No.: WO2008/032503

PCT Pub. Date: Mar. 20, 2008

(65) Prior Publication Data

US 2010/0051851 A1 Mar. 4, 2010

(30) Foreign Application Priority Data

Sep. 11, 2006 (JP) ................................ 2006-245918

(51) Int. Cl.

| | |
|---|---|
| ***B32B 5/16*** | (2006.01) |
| ***C08K 3/38*** | (2006.01) |
| ***C08K 3/10*** | (2006.01) |
| ***C08K 3/30*** | (2006.01) |
| ***C08K 3/32*** | (2006.01) |

(52) U.S. Cl.

USPC ........... 428/405; 524/405; 524/406; 524/417; 524/418; 524/431

(58) Field of Classification Search

USPC ........... 524/417, 405, 406, 418, 431; 428/405

See application file for complete search history.

(56) References Cited

U.S. PATENT DOCUMENTS

| | | | | |
|---|---|---|---|---|
| 2,501,349 | A * | 3/1950 | Nagel et al. | 428/336 |
| 6,054,219 | A * | 4/2000 | Satsu et al. | 428/403 |
| 6,544,352 | B2 | 4/2003 | Mitani et al. | |
| 6,749,767 | B2 | 6/2004 | Mitani et al. | |
| 2003/0077448 | A1 | 4/2003 | Ueta et al. | |
| 2005/0203234 | A1* | 9/2005 | Moro | 524/440 |
| 2007/0235109 | A1* | 10/2007 | Maeda et al. | 148/307 |
| 2008/0152897 | A1 | 6/2008 | Maeda et al. | |

FOREIGN PATENT DOCUMENTS

| | | | |
|---|---|---|---|
| GB | 2430682 | * | 4/2007 |
| JP | 6 260319 | | 9/1994 |
| JP | 2002 83709 | | 3/2002 |
| JP | 2003-142310 | | 5/2003 |
| JP | 2003 303711 | | 10/2003 |
| JP | 2004 143554 | | 5/2004 |
| JP | 2006-24869 | | 1/2006 |
| JP | 2006-128521 | * | 5/2006 |
| JP | 2006 202956 | | 8/2006 |
| WO | WO 2006/006545 A1 | | 1/2006 |
| WO | WO 2006/035911 A1 | | 4/2006 |
| WO | WO 2006/080121 A1 | | 8/2006 |

OTHER PUBLICATIONS

Machine translation of JP 2003-142310. May 2003.*
Machine translation of JP 2006-024869. Jan. 2006.*
Rosin, Joseph, Reagent Chemicals and Standard. 1937. p. 363.*
Machine translation of JP 2006-128521. May 2006.*
U.S. Appl. No. 12/670,750, filed Jan. 26, 2010, Mitani, et al.
U.S. Appl. No. 12/440,779, filed Mar. 11, 2009, Mitani, et al.
U.S. Appl. No. 12/368,413, filed Feb. 10, 2009, Ohwaki, et al.
Office Action issued Aug. 18, 2011 in Chinese Patent Application No. 200780024109.7 (with English translation).
Office Action as received in the corresponding Chinese Patent Application No. 200780024109.7 dated May 16, 2012.

* cited by examiner

*Primary Examiner* — John Uselding
(74) *Attorney, Agent, or Firm* — Oblon, Spivak, McClelland, Maier & Neustadt, L.L.P.

(57) ABSTRACT

An iron-based magnetic powder for dust cores has layers of phosphoric acid-based film and silicone resin film sequentially formed on the surface thereof. The phosphoric acid-based film contains at least one element selected from the group consisting of Co, Na, S, Si, and W. The iron-based powder effectively keeps insulation among iron powder particles, excels in mechanical strength even though the amount of insulating material is reduced due to achieve high-density forming, and exhibits good thermal stability necessary for electrical insulating properties even after high-temperature heat treatment.

18 Claims, No Drawings

IRON-BASED SOFT MAGNETIC POWDER FOR DUST CORE, METHOD FOR PRODUCTION THEREOF, AND DUST CORE

TECHNICAL FIELD

The present invention relates to an iron-based soft magnetic powder for dust cores which is composed of soft magnetic powder, such as iron powder and ferroalloy powder (both simply referred to as iron powder hereinafter), and a highly heat-resistant insulating film covering the surface thereof. Upon compression molding, the iron-based soft magnetic powder for dust cores can be made into dust cores to be used as dust cores for electro-magnetic parts. The dust core according to the present invention excels in mechanical properties, particularly in resistivity at high temperatures.

BACKGROUND ART

Dust cores to be used in an AC magnetic field are required to have low core loss and a high magnetic flux density. Moreover, they are also required to have good mechanical properties in the manufacturing process and high resistance to damage at the time of coil winding. One technology has been developed to meet these requirements for dust cores by coating iron powder particles with a synthetic resin. The coating film of electrically insulating synthetic resin suppresses eddy current loss and bonds iron powder particles together, thereby improving their mechanical strength.

Dust cores have recently come into general use as the core for motors. Conventional cores for motors were magnetic steel sheets or electric steel sheets in laminate form. Unlike such conventional cores, dust cores are easily produced in any three-dimensional shape by compression molding. Therefore, motors with dust cores are smaller and lighter than conventional ones. The dust cores for small and light motors are required to have a higher magnetic flux density, lower core loss, and higher mechanical strength than before.

Increase in magnetic flux density will be effectively achieved by densely forming the compact. Decrease in core loss (particularly hysteresis loss) will be effectively achieved by annealing at high temperatures to relieve strains of the compacts. The foregoing has stimulated the development of a new iron powder for dust cores which keeps electric isolation of iron powder particles even though the amount of the insulating material is reduced for dense forming and which also keeps good electrical insulation even after heat treatment (such as annealing) at high temperatures.

From the foregoing view point, there has been developed a technology to use a highly heat-resistant silicone resin as the insulating material. For example, the technology disclosed in Patent Document 1 employs a specific methyl-phenyl silicone resin as the insulating material. However, it needs not less than 1 mass % of silicone resin (based on iron powder) for good thermal stability and hence it has room for improvement in high-density forming. There are other technologies to ensure heat resistance by incorporation of silicone resin with glass powder or pigment as disclosed in Patent Documents 2 and 3. Their disadvantage is that incorporation with glass powder or pigment is undesirable for density increase.

There is another technology that employs a coating film of glassy compound (derived from phosphoric acid) as the insulating material other than synthetic resin, as disclosed in Patent Document 4. The inorganic insulating film should be superior in thermal stability to a silicone resin, which is an organic polymer; however, the present inventors found that it becomes poor in insulating performance upon heat treatment (annealing) at high temperatures (as mentioned later).

Patent Document 1.
Japanese Patent Laid-open No. 2002-83709

Patent Document 2.
Japanese Patent Laid-open No. 2004-143554

Patent Document 3.
Japanese Patent Laid-open No. 2003-303711

Patent Document 4.
Japanese Patent No. 2710152

DISCLOSURE OF THE INVENTION

Problems for Solution by the Invention

The object of the present invention to address the foregoing problems is to provide an iron powder for dust cores which effectively keeps insulation among iron powder particles and excels in mechanical strength even though the amount of insulating material is reduced to achieve high-density forming and which also exhibits good thermal stability necessary for electrical insulating properties even after heat treatment at high temperatures.

Means for Solution of the Problems

The present invention to tackle the foregoing problems is directed to an iron-based magnetic powder for dust cores which comprises an iron-based magnetic powder and layers of phosphoric acid-based film and silicone resin film sequentially formed on the surface thereof, said phosphoric acid-based film containing at least one element selected from the group consisting of Co, Na, S, Si, and W.

According to the preferred embodiments of the present invention, the silicone resin film is one which has been precured by heat treatment at 100-200° C. for 5 to 100 minutes and the silicone resin film is one which is formed from a trifunctional methyl silicone resin.

The present invention is directed also to a method for producing an iron-based magnetic powder for dust cores, said method comprising a step of dissolving in water and/or organic solvent phosphoric acid and a compound containing at least one element selected from the group consisting of Co, Na, S, Si, and W, mixing the resulting solution with an iron-based soft magnetic powder, and evaporating the solvent to form a phosphoric acid-based film on the surface of the iron-based soft magnetic powder, a step of dissolving a silicone resin in an organic solvent, mixing the resulting solution with the coated iron-based soft magnetic powder, and evaporating the solvent to form a silicone resin film on the phosphoric acid-based film, and a step of heating the resulting coated powder at 100-200° C. for 5 to 100 minutes, thereby precuring the silicone resin film, said steps being carried out sequentially in the order listed.

The present invention also covers a dust core which is obtained from the iron-based magnetic powder for dust cores as defined above, with heat treatment at 400° C. or above. The present invention further covers the heat-treated dust core as defined above which has a compact density no lower than 7.50 g/cm$^3$.

Effect of the Invention

According to the present invention, the phosphoric acid-based film contains at least one element selected from the group consisting Co, Na, S, Si, and W, so that it has improved heat resistance. The inorganic film and the silicone resin film combined together form an electrically insulating film having high heat resistance. The phosphoric acid-based film, which contributes to high heat resistance and electrically insulating properties, makes it possible to reduce the amount of the silicone resin which functions as an adhesive to exhibit mechanical strength. This in turn produces the effect of increasing the compact density of the dust core. The iron-based magnetic powder for dust cores according to the present invention can be made into a high-performance dust core which meets all the requirements for high magnetic flux density, low core loss, and high mechanical strength.

BEST MODE FOR CARRYING OUT THE INVENTION

The present inventors prepared powder compacts from an iron-based soft magnetic powder coated with film of phosphoric acid alone or phosphoric acid-based film described in Patent Document 4 (mentioned above). The powder compacts were examined for resistivity (μΩ·m) at varied temperatures. The results of this experiment revealed that all the samples decreased in resistivity to about 10 μΩ·m after heat treatment at 450° C. for 1 hour in an atmosphere of nitrogen gas. The present inventors presumed that the decrease in resistivity resulted from the diffusion of oxygen atoms (originating from the phosphoric acid in the phosphoric acid film) into iron during heat treatment at high temperatures, which forms an iron oxide that functions as a semiconductor. They further reasoned that if the formation of such semiconductor-like oxides is inhibited in some way, it would be possible to improve the thermal stability of the phosphoric acid-based film. Their extensive researches on this reasoning led to the present invention. A detailed description of the present invention follows.

According to the present invention, the iron-based soft magnetic powder for dust cores is composed of a soft magnetic powder and two layers of phosphoric acid-based film and silicone resin film covering the surface thereof. The phosphoric acid-based film is intended to provide electrical insulating properties. The silicon resin film is intended to improve electrical insulation and thermal stability and to impart mechanical strength. The iron-based soft magnetic powder for dust cores is formed into cores for rotors and stators of AC motors by compression molding. It may be optionally incorporated with a lubricant to reduce friction force at the time of compression molding.

The iron-based soft magnetic powder is a ferromagnetic metal powder, which is exemplified by pure iron powder, iron-based alloy powder (Fe—Al alloy, Fe—Si alloy, sendust, permalloy, etc.), and amorphous powder. It may be produced by atomizing (to form fine particles), reduction, and crushing. The resulting powder has a particle size of about 20 to 250 μm such that the cumulative size distribution is 50%) (measured by sieve analysis). In the present invention, it is desirable to use a powder having an average particle diameter of 50 to 150 μm.

According to the present invention, the soft magnetic powder mentioned above is first coated with a phosphoric acid-bases film. This coating film is a glassy film formed from a solution composed mainly of orthophosphoric acid ($H_3PO_4$). It should contain at least one element selected from the group consisting of Co, Na, S, Si, and W. These elements prevent oxygen atoms in the phosphoric acid-based film from forming a semiconductor-like compound with iron during heat treatment at high temperatures. This in turn prevents the powder compact from decreasing in resistivity after heat treatment.

More than one of these elements may be used in combination with one another. The combination of Si and W or Na and S is desirable because of good compatibility and thermal stability, with the latter being most desirable. The addition of Co is effective in preventing the powder compact from increasing in resistivity after heat treatment at 450° C. or above.

For these elements to produce the desired effect, they should be contained in an amount specified below for 100 mass % of iron powder coated with the phosphoric acid-based film.

P: 0.005-1 mass %), Co: 0.005-0.1 mass %, Na: 0.002-0.6 mass %, S: 0.001-0.2 mass %, Si: 0.001-0.2 mass %, and W: 0.001-0.5 mass %.

The phosphoric acid-based film mentioned above may contain Mg or B as disclosed in Patent Document 4. In this case, the amount of Mg or B should desirably be 0.001-0.5 mass % for 100 mass % of iron powder coated with the phosphoric acid-based film.

The phosphoric acid-based film should desirably be as thick as 1-250 nm. With a thickness smaller than 1 nm, it does not produce the insulating effect; with a thickness larger than 250 nm, its insulating effect levels off and it is detrimental to high-density powder compacts. An adequate amount of the film is 0.01-0.8 mass %.

The soft magnetic powder is coated with the phosphoric acid-based film by mixing it, followed by drying, with an aqueous solution of compounds containing the elements to be introduced into the coating film. Those compounds suitable for this purpose include the following.

Orthophosphoric acid ($H_3PO_4$, as P source), $Co_3(PO_4)_2$ (as Co and P sources), $Co_3(PO_4)_2.8H_2O$ (as Co and P sources), $Na_2HPO_4$ (as P and Na sources), $Na_3[PO_4.12WO_3].nH\ O$ (as P, Na, and W sources), $Na_4[SiW_{12}O_{40}].nH_2O$ (as Na, Si, and W sources), $Na_2WO_42.H_2O$ (as Na and W sources), $H_2SO_4$ (as S source), $H_3PW_{12}O_{40}nH_2O$ (as P and W sources), $SiO_2.12WO_3.26H_2O$ (as Si and W sources), MgO (as Mg source), and $H_3BO_3$ (as B source).

The aqueous solvent may be water or a hydrophilic organic solvent such as alcohol and ketone or a mixture thereof. It may contain any known surfactant.

The soft magnetic powder coated with the phosphoric acid-based film is produced by mixing iron powder (100 pars by mass) with a treating solution (1-10 parts by mass) containing 0.1-10 mass % of solids, by using any known mixer, ball mill, kneader, V-blender, or granulator. Mixing is followed by drying at 150-250° C. in the air at normal pressure or reduced pressure, or in a vacuum.

Subsequently, the silicone resin film is formed on the phosphoric acid-based film. The silicone resin undergoes curing and crosslinking when the powder compact is formed, so that the resulting powder compact increases in mechanical strength through firm bonding between powder particles. Moreover, it forms a thermally stable insulating film through the Si—O bond which has good heat resistance. The silicone resin should be one which cures rapidly. A slow curing one makes the coated powder sticky, aggravating its mechanical properties. A preferred silicone resin is one which is composed largely of trifunctional T units ($RSiX_3$) rather than one which is composed almost entirely of difunctional D units ($R_2SiX_2$), where X represents a hydrolyzable group. The one composed mostly of tetrafunctional Q units ($SiX_4$) is not desirable because it firmly bonds powder particles at the time of precuring, thereby hampering the subsequent molding process. An adequate silicone resin is one which contains T units in an amount more than 60 mol %, preferably more than 80%, and the most desirable silicone resin is one which is composed entirely of T units.

The term silicone resin usually denotes methyl-phenyl silicone resin in which the group represented by R includes methyl group and phenyl group. Such silicone resins are said to excel in heat resistance if they contain more phenyl groups than methyl groups. However, it was found that phenyl groups are not necessarily effective in the heat treatment at high temperatures which is involved in the present invention. A probable reason for this is that the bulky phenyl groups disturb the compact glassy network structure, thereby impairing thermal stability and lessening the effect of preventing the formation of compounds with iron. Therefore, the following silicone resins are recommended in the present invention.

Methyl-phenyl silicone resin containing more than 50% of methyl groups, such as KR255 and KR311 from Shin-Etsu Chemical Co., Ltd.

Methyl-phenyl silicone resin containing more than 70% of methyl groups, such as KR300 from Shin-Etsu Chemical Co., Ltd.

Methyl silicone resin free of phenyl groups, such as KR251, KR400, KR220L, KR242A, KR240, KR500, and KC89 from Shin-Etsu Chemical Co., Ltd.

The methyl-phenyl ratio and functionality of the silicone resin can be determined by FT-IR analysis.

The amount of the silicone resin film should be 0.05-0.3 mass % for the total amount (100 mass %) of the soft magnetic powder coated with the phosphoric acid-based film and the silicone resin film. With an amount less than 0.05 mass %, the resulting powder compact is poor in insulating properties and low in electrical resistance. With an amount more than 0.3 mass %, the resulting powder compact has a low density.

The silicone resin film can be formed by mixing the iron powder with a solution of a silicone resin in an organic solvent (such as alcohol, toluene, and xylene) and subsequently evaporating the solvent. The conditions for film formation are not specifically restricted. First, a resin solution containing about 2-10 mass %, of solids is prepared. Then, the soft magnetic powder (100 parts by mass) coated with the phosphoric acid-based film is mixed with the resin solution (about 0.5-10 parts by mass), Finally, the mixture is dried. The resin solution less than 0.5 parts by mass takes a longer time for mixing and tends to form an uneven film. The resin solution more than 10 parts by mass takes a longer time for drying or results in incomplete drying. The resin solution may be heated at an adequate temperature. Mixing may be accomplished by using the above-mentioned mixing machine.

The drying step should be carried out at a temperature high enough for the organic solvent to evaporate but low enough for the silicone resin to cure, so that the organic solvent is completely evaporated. An adequate drying temperature is 60-80° C. for alcohols or aromatic solvents. After drying, the treated powder should be sieved through a screen having an opening of 300-500 μm to remove aggregates.

The silicone resin film should have a thickness of 1-200 nm, preferably 1-100 nm, so that the total thickness of the phosphoric acid-based film and the silicone resin film is less than 250 nm. If the total thickness exceeds 250 nm, the powder compact decreases in magnetic flux density. In addition, it is desirable that the phosphoric acid-based film should be thicker than the silicone resin film so that the powder compact has a low core loss.

After drying, the silicone resin film should preferably be precured. The precuring keeps the coated powder particles separate from one another when the silicone resin film is cured. In other words, the precuring permits the soft magnetic powder to flow at the time of warm compaction (at about 100-250° C.). Precuring may be accomplished by heating the coated soft magnetic powder for a short time at a temperature near the curing temperature of the silicone resin. It may also be accomplished with the help of a curing agent. Difference between precuring and final curing is that precuring does not completely bond powder particles together (allowing powder particles to disintegrate easily) and final curing (which is carried out at high temperatures after compaction) firmly bonds powder particles together. Thus, final curing gives rise to a sufficiently strong powder compact.

Precuring and ensuing crushing yield an easily flowing powder that can be readily fed into a mold (like sand) at the time of powder forming. Without precuring, powder particles are so sticky to one another that they cannot be fed into a mold at the time of warm molding. Good mechanical properties are essential in practical manufacturing process. It was found that precuring makes the dust cores greatly increase in resistivity. This may be attributable to iron powder becoming compact as the result of curing.

Precuring by heating for a short time may be accomplished by heating at 100-200° C. for 5-100 minutes, preferably at 130-170° C. for 10-30 minutes. After precuring, the coated iron powder should preferably be sieved as mentioned above.

According to the present invention, the iron-based soft magnetic powder for dust cores may additionally contain a lubricant, which reduces friction among powder particles or allows powder particles to flow smoothly along the mold's inner wall at the time of compression molding. Reduced friction protects the mold from damage by the powder compact and suppresses heat generation at the time of molding. The amount of lubricant for the desired effect is at least 0.2 mass % in the total amount of powder but is less than 0.8 mass %. Excess lubricant is adverse to increasing the density of the powder compact. An amount less than 0.2 mass % will be enough if a lubricant is applied to the inner wall of the mold for compression molding.

Any known lubricant can be used. It includes metallic salt powder (such as zinc stearate, lithium stearate, and calcium stearate), paraffin, wax, and derivatives of natural or synthetic resins.

Needless to way, the iron-based soft magnetic powder for dust cores according to the present invention is used for the production of dust cores. The dust core produced from it is also covered by the present invention. The dust core is produced by compression-molding the powder mentioned above in any known way.

Compression molding should be carried out at a pressure of 490-1960 MPa, preferably 790-1180 MPa. Especially, compression molding at 980 MPa or above gives rise to dust cores having not only a density higher than 7.50 g/cm$^3$ but also high strength and high magnetic flux density. The compacting temperature is room temperature or warm temperature (100-250° C.). Warm compacting with a die wall lubrication method is desirable because it gives rise to dust cores having high strength.

Compacting is followed by heat treatment at high temperatures to make the dust core decrease in hysteresis loss. The temperature for heat treatment should preferably be not lower than 400° C. (or much higher so long as heat treatment has no adverse effect on resistivity). Duration of heat treatment should be at least 20 minutes, preferably not shorter than 30 minutes, and most desirably not shorter than 1 hour.

EXAMPLES

The invention will be described with reference to the following examples, which are not intended to restrict the scope thereof. The examples may be modified or changed within the scope of the present invention. The terms “parts” and “%” used herein denote “parts by mass” and “mass %”, respectively.

Experiment 1

Effect of Silicone Resins

This experiment was carried out with pure iron powder as the soft magnetic powder. The iron powder is “Atmel 300NH” produced by Kobe Steel Ltd., having an average particle diameter of 80-100 μm. The iron powder was coated with phosphoric acid-based film containing none of Co, Na, S, Si, and W (so as to examine the effect of the silicone resin). The coating process was carried out as follows. A mixture is prepared from 1000 parts of water, 193 parts of $H_3PO_4$, 31 parts of MgO, and 30 parts of $H_3BO_3$. The resulting mixture is diluted ten times. The diluted solution is given 200 parts of the above-mentioned pure iron powder (which has sieved through a screen having an opening of 300 μm). After mixing in a V-blender for 30 minutes or longer, the mixture is dried in the atmospheric air at 200° C. for 30 minutes. The dried powder is sieved through a screen having an opening of 300 μm.

Each of the silicone resins shown in Table 1 is dissolved in toluene to prepare a resin solution containing 4.8%) solids. Each resin solution is mixed with the iron powder (coated as above) so that the amount of coating on the iron powder is 0.15% in terms of solids. The coated iron powder is heated for drying by an oven at 75° C. for 30 minutes in the atmospheric air, followed by sieving through a screen having an opening of 300 μm. The silicone resins used in this experiment are products from Shin-Etsu Chemical Co., Ltd., whose trade names are given below.

Nos. 1 to 3: KR212, Nos. 4 to 6: KR282, Nos. 7 to 9: KR255, Nos. 10 to 12: KR300, Nos. 13 to 15: KR251, and Nos. 16 to 18: KR220L.

The coated iron powder underwent compression molding without precuring. The mold used for compression molding was lubricated with an alcohol solution of zinc stearate. Compression molding was carried out at an areal pressure of 980 MPa and at room temperature (25° C.), to give powder compacts measuring 31.75 mm by 12.7 mm by about 5 mm (in height). The powder compacts underwent heat treatment for 1 hour at temperatures shown in Table 1, with a heating rate of about 5° C./min. The heat treatment was followed by cooling in an oven.

The thus obtained powder compacts were examined for density, resistivity, and transverse strength (three-point bending test according to JPMA M09-1992 of the Japan Powder Metallurgy Association.

TABLE 1

| No. | Silicone resin: Methyl group (mol %) | Silicone resin: T units (mol %) | Temperature of heat treatment (° C.) | Density of compact (g/cm³) | Transverse strength (MPa) | Resistivity (μΩ · m) |
|---|---|---|---|---|---|---|
| 1 | 65 | 30 | 400 | 7.60 | 80.7 | 17.5 |
| 2 | | | 450 | 7.60 | 82.4 | 2.1 |
| 3 | | | 500 | 7.61 | 163.1 | 0 |
| 4 | 45 | 40 | 400 | 7.58 | 75.6 | 24.8 |
| 5 | | | 450 | 7.59 | 82.3 | 17.6 |
| 6 | | | 500 | 7.59 | 88.4 | 10.2 |
| 7 | 50 | 60 | 400 | 7.57 | 67.7 | 19.3 |
| 8 | | | 450 | 7.58 | 75.1 | 15.2 |
| 9 | | | 500 | 7.57 | 86.4 | 9.8 |
| 10 | 70 | 100 | 400 | 7.56 | 41.1 | 26.3 |
| 11 | | | 450 | 7.60 | 47.6 | 18.4 |
| 12 | | | 500 | 7.57 | 53.3 | 10.6 |
| 13 | 100 | 80 | 400 | 7.57 | 51.9 | 26.2 |
| 14 | | | 450 | 7.57 | 57.6 | 19.4 |
| 15 | | | 500 | 7.57 | 58.3 | 12.8 |
| 16 | 100 | 100 | 400 | 7.51 | 45.6 | 43.1 |
| 17 | | | 450 | 7.51 | 48.1 | 25.4 |
| 18 | | | 500 | 7.52 | 49.9 | 11.3 |

Experiment 1 shows that the samples have relatively low values of resistivity because they did not undergo precuring.

Experiment 2

Effect of Precuring

The same procedure as Example 1 was repeated to coat pure iron powder with phosphoric acid-based film and silicon resin film. A portion of the samples was precured under the conditions shown in Table 2, and the remainder of the samples were not left intact. The samples (with and without precuring) were sieved through a screen having an opening of 300 μm, and then they were examined for flow-ability at three different temperatures according to JPMA M09-1992 of the Japan Powder Metallurgy Association. The criteria for rating are as follows.

○: The sample flows freely.

Δ: The sample flows interruptedly unless tapped.

x: The sample does not flow at all.

The results are shown in Table 2.

TABLE 2

| No. | Silicone resin: Methyl group (mol %) | Silicone resin: T units (mol %) | Temperature for flowability test (° C.) | Flowability: Without precuring | Flowability: With precuring 150° C. × 10 min | Flowability: With precuring 150° C. × 30 min |
|---|---|---|---|---|---|---|
| 19 | 65 | 30 | 25 | X | Δ | Δ |
| 20 | | | 130 | X | X | X |
| 21 | | | 150 | X | X | X |
| 22 | 45 | 40 | 25 | X | Δ | Δ |
| 23 | | | 130 | X | X | X |
| 24 | | | 150 | X | X | X |
| 25 | 50 | 60 | 25 | X | Δ | Δ |

TABLE 2-continued

| | Silicone resin | | | | | |
|---|---|---|---|---|---|---|
| | Methyl | | Temperature | Flowability | | |
| No. | group (mol %) | T units (mol %) | for flowability test (° C.) | Without precuring | With precuring 150° C. × 10 min | With precuring 150° C. × 30 min |
| 26 | | | 130 | X | X | X |
| 27 | | | 150 | X | X | X |
| 28 | 70 | 100 | 25 | ○ | ○ | ○ |
| 29 | | | 130 | Δ | Δ | ○ |
| 30 | | | 150 | X | Δ | Δ |
| 31 | 100 | 80 | 25 | ○ | ○ | ○ |
| 32 | | | 130 | Δ | Δ | Δ |
| 33 | | | 150 | X | X | X |
| 34 | 100 | 100 | 25 | ○ | ○ | ○ |
| 35 | | | 130 | Δ | ○ | ○ |
| 36 | | | 150 | X | Δ | ○ |

It is noted from Table 2 that the silicone resin containing more than 70 mol % of methyl groups and more than 80 mol % of T units poses no problems in actual operation.

Experiment 3

Performance of Actual Dust Core

The same procedure as in Experiment 1 was repeated to form the phosphoric acid-based film and silicone resin film on iron powder except that the silicone resin was replaced by the one (KR220L from Shin-Etsu Chemical) containing 100 mol % of methyl group and 100 mol % of T units. The phosphoric acid-based film was formed from the solution which has the following composition (before dilution ten times).

Solution for Nos. 37-41: water: 1000 parts, $H_3PO_4$: 193 parts.

Solution for Nos. 42-46: water: 1000 parts, $H_3PO_4$: 193 parts, MgO: 31 parts, $H_3BO_3$: 30 parts.

Solution for Nos. 47-51: water: 1000 parts, $H_3PO_4$: 193 parts, MgO: 31 parts, $H_3BO_3$: 30 parts, $H_3PW_{12}O_{40}.nH_2O$: 150 parts.

Solution for Nos. 52-56: water: 1000 parts, $H_3PO_4$: 193 parts, MgO: 31 parts, $H_3BO_3$: 30 parts, $SiO_2.12WO_3.26H_2O$: 150 parts.

Solution for Nos. 57-61: water: 1000 parts, $Na_2HPO_4$: 88.5 parts, $H_3PO_4$: 181 parts, $H_2SO_4$: 61 parts.

Solution for Nos. 62-66: water: 1000 parts, $H_3PO_4$: 193 parts, $Co_3(PO_4)_2$: 30 parts.

Solution for Nos. 67-71: water: 1000 parts, $H_3PO_4$: 193 parts, MgO:31 parts, $H_3BO_3$: 30 parts, $Co_3(PO_4)_2$: 30 parts.

Solution for Nos. 72-76: water 1000 parts, $H_3PO_4$: 193 parts, MgO: 31 parts, $H_3BO_3$: 30 parts, $H_3PW_{12}O_{40}.nH_2O$: 150 parts, $Co_2(PO_4)_2$: 30 parts.

Solution for Nos. 77-81: water 1000 parts, $H_3PO_4$: 193 parts, MgO: 31 parts, $H_3BO_3$: 30 parts, $SiO_2.12WO_3.26H_2O$: 150 parts, $Co_2(PO_4)_2$: 30 parts.

Solution for Nos. 82-86: water 1000 parts, $Na_2HPO_4$: 88.5 parts, $H_3PO_4$: 181 parts, $H_2SO_4$: 61 parts, $Co_2(PO_4)_2$: 30 parts.

The coated iron powder was sieved through the screen mentioned above and then subjected to precuring in the atmospheric air at 150° C. for 30 minutes. After precuring the coated iron powder was formed into powder compacts in the same way as in Experiment 1. The powder compacts underwent heat treatment in the atmosphere of nitrogen at different temperatures (shown in Table 3) for 1 hour. The samples were tested at 25° C. for density, transverse strength, and resistivity (initial values). The results are shown in Tables 3 and 4.

TABLE 3

| No. | Elements added to phosphoric acid-based film | Temperature of heat treatment (° C.) | Density of powder compact (g/cm$^3$) | Transverse strength (MPa) | Resistivity (μΩ · m) |
|---|---|---|---|---|---|
| 37 | P | 400 | 7.52 | 35.0 | 215.0 |
| 38 | | 450 | 7.54 | 60.0 | 110.0 |
| 39 | | 500 | 7.54 | 60.0 | 80.0 |
| 40 | | 550 | 7.54 | 62.0 | 10.0 |
| 41 | | 600 | 7.55 | 64.0 | 0.1 |
| 42 | P, Mg, B | 400 | 7.51 | 28.9 | 352.3 |
| 43 | | 450 | 7.53 | 52.1 | 129.7 |
| 44 | | 500 | 7.53 | 51.8 | 138.3 |
| 45 | | 550 | 7.54 | 50.8 | 21.7 |
| 46 | | 600 | 7.54 | 52.0 | 0.1 |
| 47 | P, W, Mg, B | 400 | 7.53 | 32.6 | 421.5 |
| 48 | | 450 | 7.53 | 69.3 | 193.9 |
| 49 | | 500 | 7.54 | 69.4 | 131.2 |
| 50 | | 550 | 7.55 | 67.2 | 93.9 |
| 51 | | 600 | 7.54 | 68.0 | 0.1 |
| 52 | P, W, Si, Mg, B | 400 | 7.50 | 38.5 | 467.7 |
| 53 | | 450 | 7.51 | 71.3 | 231.5 |
| 54 | | 500 | 7.52 | 71.7 | 223.5 |
| 55 | | 550 | 7.52 | 80.1 | 153.9 |
| 56 | | 600 | 7.51 | 78.0 | 0.1 |
| 57 | P, Na, S | 400 | 7.50 | 30.4 | 615.9 |
| 58 | | 450 | 7.50 | 101.9 | 514.2 |

TABLE 3-continued

| No. | Elements added to phosphoric acid-based film | Temperature of heat treatment (° C.) | Density of powder compact (g/cm$^3$) | Transverse strength (MPa) | Resistivity (μΩ · m) |
|---|---|---|---|---|---|
| 59 | | 500 | 7.51 | 103.0 | 244.7 |
| 60 | | 550 | 7.52 | 101.9 | 144.3 |
| 61 | | 600 | 7.51 | 103.0 | 39.9 |

TABLE 4

| No. | Elements added to phosphoric acid-based film | Temperature of heat treatment (° C.) | Density of powder compact (g/cm$^3$) | Transverse strength (MPa) | Resistivity (μΩ · m) |
|---|---|---|---|---|---|
| 62 | P, Co | 400 | 7.51 | 101 | 285.6 |
| 63 | | 450 | 7.52 | 101 | 250.3 |
| 64 | | 500 | 7.51 | 102 | 205.4 |
| 65 | | 550 | 7.52 | 101 | 134.7 |
| 66 | | 600 | 7.52 | 94 | 56.9 |
| 67 | P, Mg, B, Co | 400 | 7.50 | 54 | 338.6 |
| 68 | | 450 | 7.52 | 52 | 310.7 |
| 69 | | 500 | 7.51 | 51 | 246.3 |
| 70 | | 550 | 7.52 | 50 | 180.2 |
| 71 | | 600 | 7.53 | 61 | 91.5 |
| 72 | P, W, Mg, B, Co | 400 | 7.52 | 70 | 410.4 |
| 73 | | 450 | 7.53 | 71 | 361.3 |
| 74 | | 500 | 7.53 | 72 | 330.2 |
| 75 | | 550 | 7.53 | 80 | 203.6 |
| 76 | | 600 | 7.53 | 98 | 95.6 |
| 77 | P, W, Si, Mg, B, | 400 | 7.50 | 70 | 457.1 |
| 78 | Co | 450 | 7.50 | 70 | 380.2 |
| 79 | | 500 | 7.51 | 70 | 338.5 |
| 80 | | 550 | 7.51 | 67 | 226.7 |
| 81 | | 600 | 7.50 | 78 | 110.9 |
| 82 | P, Na, S, Co | 400 | 7.52 | 104 | 530.6 |
| 83 | | 450 | 7.50 | 104 | 385.6 |
| 84 | | 500 | 7.50 | 101 | 341.6 |
| 85 | | 550 | 7.50 | 100 | 280.3 |
| 86 | | 600 | 7.51 | 93 | 127.1 |

It is noted from Tables 3 and 4 that samples Nos. 47-86 are superior to samples Nos. 37-46 in resistivity at high temperatures (greater than 90 μΩ·m even after heat treatment at 550° C.) because the former contains at least one species of Co, Na, S, Si, and W in the phosphoric acid-based film but the latter do not. Samples Nos. 57-61 and Nos. 62-86 are particularly superior in resistivity because the former contain Na and S in combination and the latter contain Co.

Experiment 4

Evaluation of Powder Compact

The same procedure as for sample No. 57 was repeated to prepare four samples of powder compact varying in density from 7.30 to 7.60 g/cm$^3$ except that the areal pressure for compression molding was changed. It was found that the samples increase in strength and magnetic flux density according as they increase in density from 7.30 or 7.40 g/cm$^3$ (resulting from an areal pressure of 680 or 790 MPa, respectively) to 7.50 or 7.60 g/cm$^3$ (resulting from an areal pressure of 980 or 1180 MPa, respectively).

The invention has been described in detail with reference specific embodiments; however, it may be modified or changed without departing from the sprit and scope thereof. The present application is based on the Japanese Patent Application (No. 2006-245918) filed on Sep. 11, 2006. It is referenced in the foregoing specification.

EXPLOITATION IN INDUSTRY

According to the present invention, the iron-based magnetic powder for dust cores has a thermally stable insulating film formed thereon, so that it can be made into dust cores which have a high magnetic flux density, low core loss, and high mechanical strength. The dust cores will be used for rotors and stators of motors.

The invention claimed is:

1. An iron-based magnetic powder for dust cores which comprises an iron-based magnetic powder and layers of phosphoric acid-based film and silicone resin film sequentially formed on the surface thereof, wherein said phosphoric acid-based film at least contains Co.

2. The iron-based magnetic powder for dust cores as defined in claim 1, wherein the silicone resin film is one which has been precured by heat treatment at 100-200° C. for 5 to 100 minutes.

3. The iron-based magnetic powder for dust cores as defined in claim 1, wherein the silicone resin to form the silicone resin film is a trifunctional methyl silicone resin.

4. An iron-based magnetic powder for dust cores which comprises an iron-based magnetic powder and layers of phosphoric acid-based film and silicone resin film sequentially formed on the surface thereof, wherein said phosphoric acid-based film contains Co and at least one other element selected from the group consisting of Na, S, Si, and W.

5. The iron-based magnetic powder of claim 1, wherein Co is contained in the phosphoric acid-based film by mixing a compound selected from the group consisting of $Co_3(PO_4)_2$ and $Co_3(PO_4)_2.8H_2O$ in the phosphoric acid-based film.

6. The iron-based magnetic powder of claim 4, wherein at least one other element selected from the group consisting of Na, S, Si, and W is contained in the phosphoric acid-based film by mixing a compound selected from the group consisting of $Na_3[PO_4.12WO_3].nH_2O$, $Na_4[SiW_{12}O_{40}].nH_2O$, $Na_2WO_4.2H_2O$, $SiO_2.12WO_326H_2O$, and $H_2SO_4$ in the phosphoric acid-based film.

7. The iron-based magnetic powder of claim, wherein at least one element selected from Mg and B is additionally contained in the phosphoric acid-based film.

8. The iron-based magnetic powder of claim 4, wherein at least one element selected from Mg and B is additionally contained in the phosphoric acid-based film.

9. The iron-based magnetic powder of claim 7, wherein at least one element selected from Mg and B is contained in the phosphoric acid-based film by mixing a compound selected from the group consisting of MgO and $H_3BO_3$ in the phosphoric acid-based film.

10. The iron-based magnetic powder of claim 8, wherein at least one element selected from Mg and B is contained in the phosphoric acid-based film by mixing a compound selected from the group consisting of MgO and $H_3BO_3$ in the phosphoric acid-based film.

11. The iron-based magnetic powder of claim 1, wherein Co is contained in the phosphoric acid-based film in the following amount based on 100 mass % of iron powder coated with the phosphoric acid-based film:

Co: 0.005-0.1 mass %.

12. The iron-based magnetic powder of claim 4, wherein the elements, when they are contained in the phosphoric acid-based film, are contained in the following amounts based on 100 mass % of iron powder coated with the phosphoric acid-based film:

Co: 0.005-0.1 mass %,
Na: 0.002-0.6 mass %,
S: 0.001-0.2 mass %,
Si: 0.001-0.2 mass %, and
W: 0.001-0.5 mass %.

13. The iron-based magnetic powder of claim 1, wherein the phosphoric acid-based film is 1-250 nm thick and the amount of the film is 0.01-0.8 mass %.

14. The iron-based magnetic powder of claim 4, wherein the phosphoric acid-based film is 1-250 nm thick and the amount of the film is 0.01-0.8 mass %.

15. The iron-based magnetic powder of claim 1, wherein the silicone resin film is 1-200 nm thick, the amount of the silicone resin film is 0.05-0.3 mass %, and the total thickness of the phosphoric acid-based film and the silicone resin film is less than 250 nm.

16. The iron-based magnetic powder of claim 4, wherein the silicone resin film is 1-200 nm thick, the amount of the silicone resin film is 0.05-0.3 mass %, and the total thickness of the phosphoric acid-based film and the silicone resin film is less than 250 nm.

17. The iron-based magnetic powder for dust cores as defined in claim 4, wherein the silicone resin film is one which has been precured by heat treatment at 100-200° C. for 5 to 100 minutes.

18. The iron-based magnetic powder for dust cores as defined in claim 4, wherein the silicone resin to form the silicone resin film is a trifunctional methyl silicone resin.

* * * * *